(12) United States Patent
Tomita

(10) Patent No.: US 7,886,071 B2
(45) Date of Patent: Feb. 8, 2011

(54) COMMUNICATION PROCESSING DEVICE, COMMUNICATION CONTROL METHOD, AND COMPUTER PROGRAM

(75) Inventor: Nobuyoshi Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 12/090,487

(22) PCT Filed: Aug. 1, 2007

(86) PCT No.: PCT/JP2007/065101
§ 371 (c)(1),
(2), (4) Date: May 28, 2008

(87) PCT Pub. No.: WO2008/020547
PCT Pub. Date: Feb. 21, 2008

(65) Prior Publication Data
US 2008/0259964 A1 Oct. 23, 2008

(30) Foreign Application Priority Data
Aug. 17, 2006 (JP) ............................. 2006-222223

(51) Int. Cl.
*G06F 15/16* (2006.01)
(52) U.S. Cl. ...................................... 709/231; 386/124
(58) Field of Classification Search ................. 709/231; 386/124
See application file for complete search history.

(56) References Cited

U.S. PATENT DOCUMENTS 7,447,242 B2 * 11/2008 Geagan et al. .............. 370/538

| | | |
|---|---|---|
| 2003/0126238 A1 | 7/2003 | Kohno et al. |
| 2004/0255219 A1 | 12/2004 | Grossman, IV et al. |
| 2005/0125533 A1 | 6/2005 | Svanbro et al. |
| 2005/0204052 A1 * | 9/2005 | Wang et al. .................. 709/231 |

FOREIGN PATENT DOCUMENTS

| | | |
|---|---|---|
| JP | EP001507412 A1 * | 5/2002 |
| JP | 2005 6340 | 1/2005 |
| JP | 2005 518120 | 6/2005 |
| JP | 2005 348015 | 12/2005 |
| JP | 3757857 | 1/2006 |

* cited by examiner

*Primary Examiner*—Patrice L Winder
*Assistant Examiner*—Asghar Bilgrami
(74) *Attorney, Agent, or Firm*—Oblon, Spivak, McClelland, Maier & Neustadt, L.L.P.

(57) ABSTRACT

A configuration is provided that performs retransmission control in accordance with a processing state in which playback of received data is performed or a processing state in which playback and recording of the received data is performed. When a communication processing apparatus receives streaming data, the communication processing apparatus is in one of the following two states: (1) a state in which "only playback" is performed, and (2) a state in which "playback and recording" are performed. The communication processing apparatus determines in which state it is and changes the way in which a retransmission request for a lost packet is sent on the basis of the determined state. According to such a configuration, when the communication processing apparatus performs only a playback process, a real-time playback can be achieved. When the communication processing apparatus performs a recording process, the integrity of recorded data can be improved.

11 Claims, 5 Drawing Sheets

US 7,886,071 B2

COMMUNICATION PROCESSING DEVICE, COMMUNICATION CONTROL METHOD, AND COMPUTER PROGRAM

TECHNICAL FIELD

The present invention relates to a communication processing apparatus, a communication control method, and a computer program. In particular, the present invention relates to a communication processing apparatus, a communication control method, and a computer program that perform a playback process and a recording process on received data and that perform optimal communication control in accordance with a processing status indicating whether an executed process is only the playback process or the playback process with a recording process.

BACKGROUND ART

With a widespread use of a broadband network, a real-time playback of a large amount of data, such as image data, has been available through data communication. For example, for IP telephones and TV telephones, image data is transmitted together with voice data and is played back in real time at each end of communication. Thus, bi-directional communication is achieved.

A communication method for communicating data in real time is referred to as "streaming communication". An example of a protocol for streaming is a streaming protocol on TCP, such as HTTP (Hyper Texttransfer Protocol) streaming. In the TCP communication, if packet loss occurs somewhere in a network, the reception side automatically sends a retransmission request. In this way, a reliable packet communication is achieved. That is, in communication using TCP, a retransmission request is automatically sent, and therefore, packets are reliably delivered to a reception application in a proper sequence.

However, in communication using the TCP (Transmission Control Protocol), if a retransmission request frequently occurs, a large delay occurs. Therefore, the TCP communication is not suitable for streaming distribution that requires real-time communication.

In contrast, in streaming distribution over UDP (User Datagram Protocol), such as RTP (Real-time Transport Protocol, RFC3550) streaming, even if packet loss occurs somewhere in a network, the reception side does not basically send a retransmission request. Accordingly, the occurrence of a delay can be reduced. Thus, when real-time communication is required, streaming over the UDP is used, in general. However, in the communication using the RTP or UDP, lost data due to packet loss is not received by the reception application, which is problematic.

To solve this problem occurring for the RTP and UDP, a configuration is proposed in which an application that performs a process of received data can determine that it sends a retransmission request to a streaming transmission side. For example, when the application determines that it needs data in order to perform a stable playback operation, the application requests the streaming transmission side to retransmit the packet. However, if such a retransmission request is sent, a delay occurs as in the above-described case using TCP.

For example, if packet loss occurs during streaming playback and a retransmission request is sent and if a retransmitted packet is not received before a playback process starts, amounts of processing of the transmission side and the reception side increase. Accordingly, it follows that useless packets are disadvantageously sent in the network. To solve such a problem, Patent Document 1 (Japanese Patent No. 3757857) describes a configuration in which only a retransmission request for a "packet that is likely to arrive on time for playback" is sent from the reception side as needed.

For example, when video data is received via the Internet and is recorded (stored), the real-time operation may not be needed. In such a case, in general, a download using HTTP (TCP) in which data is reliably received is used. In contrast, streaming playback is performed and the received streaming data is recorded, a real-time operation in the playback process has priority. Accordingly, in general, a download using HTTP that interferes with real-time playback is not used.

As noted above, an appropriate communication protocol is used for each of a streaming playback process that does not allow the occurrence of delay and a reception data recording process that allows the occurrence of delay. A configuration has not been proposed that realizes a process that meets requirements for these processes (i.e., the streaming playback process and the reception data recording process) and that is appropriate for both the playback process and the recording process.

For example, Patent Document 2 (Japanese Unexamined Patent Application Publication No. 2005-86362) describes a configuration of a recording method used when streaming is performed. However, in the described method, the HTTP is used, and a playback skip is performed if a retransmission request is sent and a delay occurs. Accordingly, the quality of the playback deteriorates.

Patent Document 1: Japanese Patent No. 3757857
Patent Document 2: Japanese Unexamined Patent Application Publication No. 2005-86362

DISCLOSURE OF INVENTION

Technical Problem

Accordingly, in order to solve the above-described problem, it is an object of the present invention to provide a communication processing apparatus, a communication processing method, and a computer program that perform playback processing and recording processing of received data and that perform appropriate communication control in accordance with a processing state (e.g., in accordance with whether the executed process is only a playback process or a playback process with a recording process).

Technical Solution

According to a first aspect of the present invention, a communication processing apparatus for performing data reception via a network is provided. The communication processing apparatus is characterized in that the communication processing apparatus comprises a state management unit for performing state management as to whether a processing state of the communication processing apparatus is a playback state in which only playback of the received data is performed or a playback and recording state in which both playback and recording of the received data are performed, a data loss detection unit for detecting lost data in the received data, and a retransmission request control unit for performing a determination process as to whether a retransmission request for the lost data is output or not, and in that the retransmission request control unit determines whether a retransmission request is made or not on the basis of a determination whether retransmission data based on retransmission request data is received before a playback process starts when the communication processing apparatus is in the playback state in which only playback is performed, and the retransmission request control unit determines whether a retransmission request is made or not on the basis of a determination whether the number of sent retransmission requests for one lost data item reaches a predetermined set maximum count when the communication processing apparatus is in the playback and recording state in which both playback and recording are performed.

In addition, according to an embodiment of present invention, the communication processing apparatus is characterized in that the received data is data received on a packet-to-packet basis.

Furthermore, according to an embodiment of present invention, the communication processing apparatus is characterized in that the retransmission request control unit is configured to perform a process for determining whether a retransmission request is sent or not on the basis of a pre-measured round-trip delay time between the communication processing apparatus and a data transmission apparatus when the communication processing apparatus is in the playback state in which only playback is performed.

Still furthermore, according to an the embodiment of present invention, the communication processing apparatus is characterized in that it further comprises a decode buffer used for accumulating data applied to a playback process and a playback/recording determination unit for performing control for storing data in a recording buffer that accumulates data applied to a recording process, and the playback/recording determination unit is configured to receive, from the state management unit, state information indicating whether the processing state of the communication processing apparatus is the playback state in which only playback of the received data is performed or the playback and recording state in which both playback and recording of the received data are performed so as to change the way in which data accumulation processing is performed in the buffer.

Still furthermore, according to an the embodiment of present invention, the communication processing apparatus is characterized in that the playback/recording determination unit informs the retransmission request control unit of playback time information corresponding to received data being subjected to a playback process, and the retransmission request control unit is configured to determine whether retransmission data based on retransmission request data is received before a playback process starts using the information received from the playback/recording determination unit, namely, playback time information corresponding to reception data being subjected to a playback process.

In addition, according to a second aspect of the present invention, a communication control method for use in a communication processing apparatus for receiving data via a network is characterized in that the communication control method comprises a state management step for determining by a state management unit whether a processing state of the communication processing apparatus is a playback state in which only playback of the received data is performed or a playback and recording state in which playback and recording of the received data are performed, a data loss detection step for detecting, by a data loss detection unit, lost data in the received data, and a retransmission request control step for performing, by a retransmission request control unit, a determination process as to whether a retransmission request for the lost data is output or not, and, in the retransmission request control step, the retransmission request control unit determines whether a retransmission request is made or not on the basis of a determination whether retransmission data based on retransmission request data is received before a playback process starts when the communication processing apparatus is in a playback state in which only playback is performed, and the retransmission request control unit determines whether a retransmission request is made or not on the basis of a determination whether the number of sent retransmission requests for one lost data item reaches a predetermined set maximum count when the communication processing apparatus is in a playback and recording state in which both playback and recording are performed.

Furthermore, according to an embodiment of present invention, the communication control method is characterized in that the received data is data received on a packet-to-packet basis.

Still furthermore, according to an embodiment of present invention, the communication control method is characterized in that the retransmission request control step performs a process for determining whether a retransmission request is sent or not on the basis of a pre-measured round-trip delay time between the communication processing apparatus and a data transmission apparatus when the communication processing apparatus is in a playback state in which only playback is performed.

Still furthermore, according to an embodiment of present invention, the communication control method is characterized in that it further comprises a playback/recording determination step for performing, by a playback/recording determination unit, control for storing data in a decode buffer used for accumulating data applied to a playback process and storing data in a recording buffer for accumulating data applied to a recording process, and in that, in the playback/recording determination step, the playback/recording determination unit receives, from the state management unit, state information indicating whether the processing state of the communication processing apparatus is a playback state in which only playback of the received data is performed or a playback and recording state in which both playback and recording of the received data are performed so as to change the way in which data accumulation processing is performed in the buffer.

Still furthermore, according to an embodiment of present invention, the communication control method is characterized in that the playback/recording determination unit informs the retransmission request control unit of playback time information corresponding to received data being subjected to a playback process, and the retransmission request control unit determines whether retransmission data based on a retransmission request data is received before a playback process starts using the information received from the playback/recording determination unit, namely, playback time information corresponding to reception data being subjected to a playback process.

In addition, according to a third aspect of the present invention, a computer program for causing a communication processing apparatus for receiving data via a network to perform communication control is characterized in that the computer program comprises a state management step for determining by a state management unit whether a processing state of the communication processing apparatus is a playback state in which only playback of the received data is performed or a playback and recording state in which playback and recording of the received data are performed, a data loss detection step for detecting, by a data loss detection unit, lost data in the received data, and a retransmission request control step for performing, by a retransmission request control unit, a determination process as to whether a retransmission request for the lost data is output or not, and, in the retransmission request control step, the retransmission request control unit determines whether a retransmission request is made or not on the basis of a determination whether retransmission data based on retransmission request data is received before a playback process starts when the communication processing apparatus is in a playback state in which only playback is performed, and the retransmission request control unit determines whether a retransmission request is made or not on the basis of a determination whether the number of sent retransmission requests for one lost data item reaches a predetermined set maximum count when the communication processing apparatus is in a playback and recording state in which both playback and recording are performed.

Note that a computer program according to the present invention is a computer program that can be provided to general-purpose computer systems that can execute a variety of program code using a computer-readable storage medium or a computer-readable communication medium, for example, a storage medium, such as a CD, an FD, or an MO, or a communication medium, such as a network. By providing such a program in a computer-readable format, a process in accordance with the program can be achieved on a computer system.

Further objects, features, and advantages of the present invention will become apparent from the following more detailed description of embodiments with reference to the attached drawings. As used in the present specification, the term "system" refers to a logical combination of a plurality of devices; the plurality of devices is not necessarily included in one body.

ADVANTAGEOUS EFFECTS

According to an embodiment of the present invention, a communication processing apparatus for performing, for example, streaming data reception for a real-time streaming playback process is configured to perform control by changing a determination state whether or not a retransmission request of a lost packet is made in accordance with the following processing state:

(1) "only playback" is performed, or (2) "playback and recording" is performed.

Accordingly, playback processing and recording processing for obtaining an intended data state (e.g., data state for a real-time playback when only a playback process is performed and data state for increased the integrity of recorded data when a recording process is performed) can be achieved.

BEST MODES FOR CARRYING OUT THE INVENTION

Figure 1:
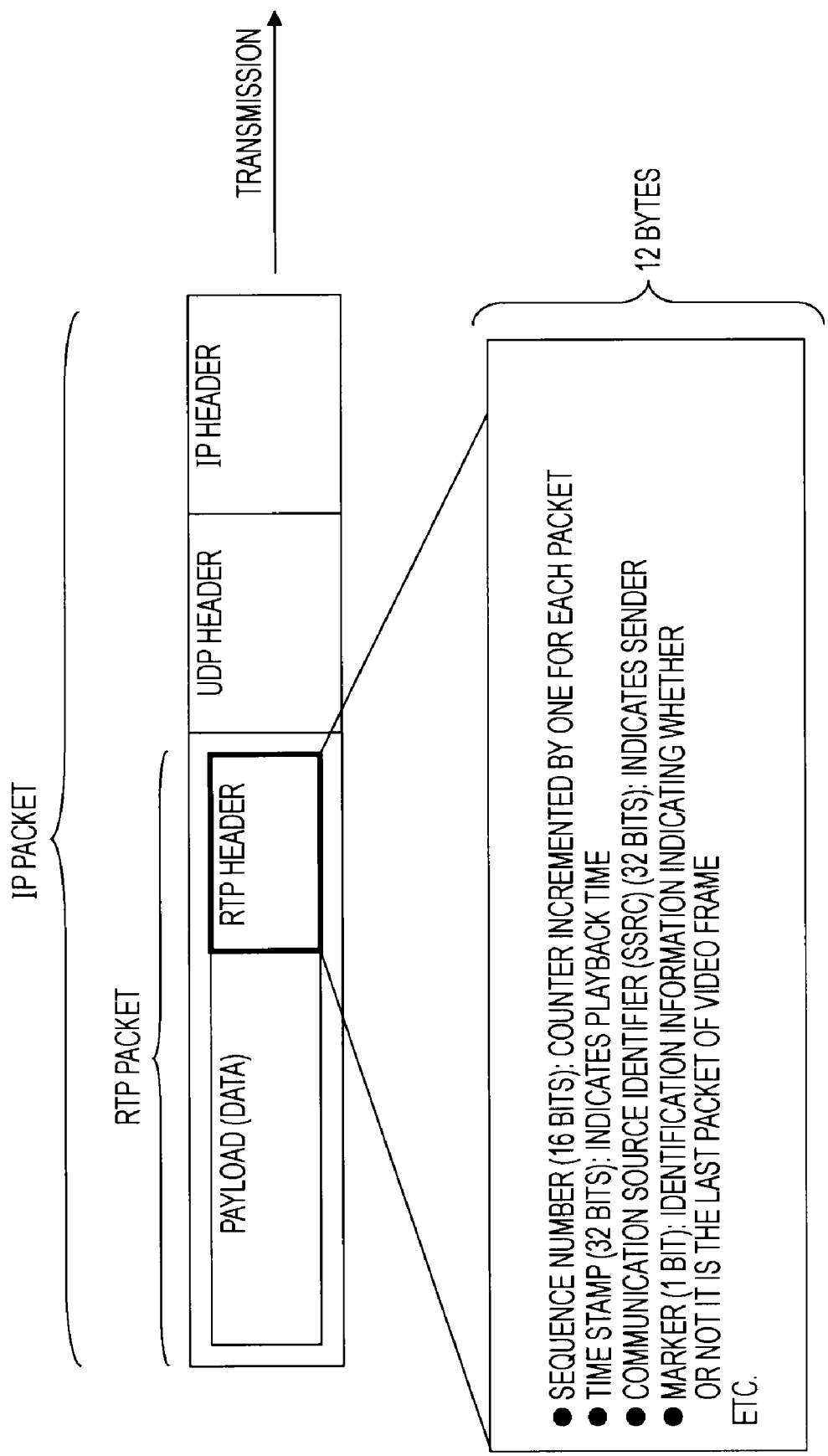
FIG. 1 is a diagram illustrating an example of a packet structure for use in a communication process.

A communication processing apparatus, a communication control method, and a computer program according to the present invention are described in detail with reference to accompanying drawings.

According to the present invention, when a communication processing apparatus is configured to receive streaming data in order to perform, for example, a real-time streaming playback process, the communication processing apparatus is in one of the following two states:

(1) a state in which "only playback" is performed, or (2) a state in which "playback and recording" is performed.

Regardless of the two states, the communication processing apparatus performs packet reception control in accordance with each of the states to receive data. Thus, the communication processing apparatus performs a playback operation or a recording operation based on the data acquisition suitable for the processing state.

Before describing the configuration and process of the communication processing apparatus according to the present invention, an example of a communication structure using RTP or UDP protocols in which a retransmission request for a "packet that is likely to arrive on time for playback" is sent from the reception side is schematically described. Note that an example of this process is described in, for example, a relevant patent (Japanese Patent No. 3757857) obtained by the present inventor. The communication processing apparatus employs RTP (Real-time Transport Protocol, RFC3550) or UDP (User Datagram Protocol) for a communication protocol so as to perform real-time streaming playback.

For apparatuses that perform real-time streaming playback, it is important to guarantee a real-time operation, that is, it is important to play back received data with minimal delay. To achieve playback with a short delay, a packet loss detection unit of the communication processing apparatus detects loss of a received packet and performs the following processing:

(Step 1)
estimating a "playback time that is attached to a packet for which packet loss is detected"

(Step 2)
comparing the "playback time" of the lost packet estimated in step 1 with a "current playback time+T (margin time)"

(Step 3)
(3a) If the "playback time" of the lost packet is greater (later) than the "current playback time+T (margin time)", a margin greater than or equal to T is available before a received packet is played back. Accordingly, it is determined that a retransmission process is completed before playback is started, and therefore, a retransmission request is sent from a "retransmission requesting unit" to the transmission side.

(3b) If the "playback time" of the lost packet is less (earlier) than the "current playback time+T (margin time)", it is determined that a retransmission process is not completed before playback is started, and therefore, a retransmission request is not sent.

Through the above-described process, a configuration in which a reception side sends a retransmission request only for a "packet that is likely to arrive on time for playback" is achieved. A packet includes a playback time used for a reception side to perform data playback in proper sequence. An example of the playback time is a time stamp of a RTP packet. For example, in the RTP specification, the same time stamp is attached to a plurality of packets including data in the same frame of video data.

FIG. 1 illustrates the structure of an RTP packet. As illustrated in FIG. 1, the RTP packet includes a payload corresponding to actual data, such as moving image data. The RTP packet further includes an RTP header, a UDP header, and an IP header which correspond to respective protocols. The RTP header includes the following information:

a sequence number (16 bits): a counter incremented by one for each packet, a time stamp (32 bits): indicates a playback time, a communication source identifier (SSRC) (32 bits): indicates a sender, and a marker (1 bit)=identification information indicating whether or not it is the last packet of a video frame.

Determination whether a retransmission request is executed or not is made by referring to the time stamp of the RTP header indicating a playback time. If the packet loss detection unit (a data loss detection unit) of the communication processing apparatus that performs data reception and playback detects packet loss, the packet loss detection unit estimates the time stamp attached to the lost packet using the packet stamps of the previous and subsequent packets. Note that, even when continuous packets are lost or the first or last packet of a frame is lost, the range of the time stamps is estimated on the basis of the previous and subsequent packets.

The communication processing apparatus determines whether a retransmission request is sent or not by determining if the "playback time" of the lost packet is greater (later) than the "current playback time+T (margin time)". Here, T (margin time) is a reference value used for determining whether, after a retransmission request is sent to a streaming transmission side, a requested packet is retransmitted and received before playback of the packet starts. For example, T is defined as an RTT (Round-Trip Time) value that represents a data round-trip delay time between the transmission side and the reception side.

Figure 2:
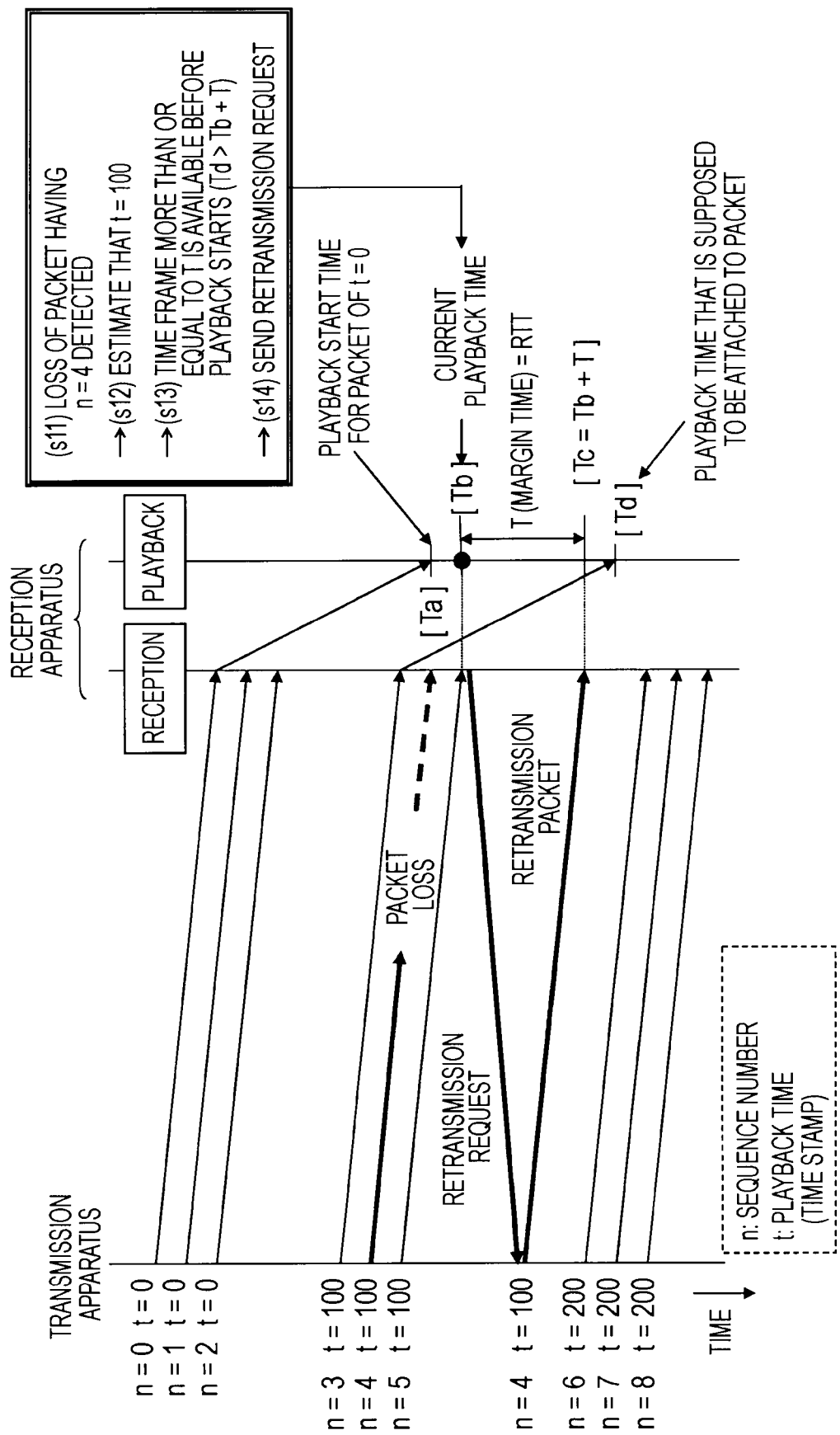
FIG. 2 is a diagram illustrating a retransmission control sequence based on RTT.

A sequence of a data transmission and reception process, the determination process of sending a retransmission request using the RTT, a retransmission process, and a reception process is described with reference to FIG. 2. In FIG. 2, a transmission unit that performs a transmission process of streaming data is illustrated on the left, and a reception unit that receives the streaming data and performs a playback process is illustrated on the right.

The transmission unit sequentially transmits a packet having a sequence number [n] and a time stamp [t] assigned thereto. As described above, the sequence number [n] is a counter value set for each of the packets. The sequence number [n] is incremented by one for each of the packets. The time stamp [t] represents a playback time. In an example shown in the drawing, three packets contain data corresponding to one playback time.

The transmission unit transmits three packets having n =1 to 3 for a playback time t=0 to a transmission unit first. Then, the transmission unit receives these packets and plays back these packets. A playback timing is indicated by a time [Ta] in the drawing.

In addition, the transmission unit continuously performs a packet transmission process, and the reception unit performs a reception process and a playback process. Assume that a packet having a sequence number n=4 and a time stamp t=100 cannot be received by the reception unit during these processes. In such a case, the reception unit identifies a lost packet using the sequence numbers and time stamp information about the previous and subsequent received packets. That is, the reception unit estimates that the sequence number of the lost packet n=4 and the time stamp of the lost packet t=100.

The reception unit determines on the basis of this estimation whether it makes a retransmission request for the lost packet [n=4, T=100]. That is, as described above, the reception unit performs the following operations:

(a) If the "playback time" of the lost packet is greater (later) than the "current playback time+T (margin time)", a margin greater than or equal to T is available before a received packet is played back. Accordingly, it is determined that a retransmission process is completed before playback is started, and therefore, a retransmission request is sent from the "retransmission requesting unit" to the transmission side.

(b) If the "playback time" of the lost packet is less (earlier) than the "current playback time+T (margin time)", it is determined that a retransmission process is not completed before playback is started, and therefore, a retransmission request is not sent.

Through the above-described process, a retransmission request only for a "packet that is likely to arrive on time for playback" is sent.

In an example illustrated in FIG. 2, the current playback time is [Tb]. The margin time is [T]. An RTT (Round-Trip Time) that represents a delay time when data travels back and forth between the transmission unit and the reception unit can be applied to the margin time [T]. This margin time [T] is measured in advance. In addition, the playback time of a lost packet [n=4, T=100] is [Td].

In this case, the reception unit determines whether the "playback time (Td)" of the lost packet [n=4, T=100] is greater than the "current playback time (Tb)+T (margin time)", that is, whether Td>Tb+T is satisfied or not.

If the above-described conditional expression: Td>Tb+T is satisfied, a margin greater than or equal to T is available before a received packet is played back. Accordingly, it is determined that a retransmission process is completed before playback is started, and therefore, a retransmission request is sent from the "retransmission requesting unit" to the transmission side.

However, if the above-described conditional expression is not satisfied, it is determined that a retransmission process is not completed before playback is started, and therefore, a retransmission request is not sent.

Through the above-described process, the reception unit is configured to select a "packet that is likely to arrive on time for playback" and send a retransmission request only for the "packet that is likely to arrive on time for playback".

The method described with reference to FIG. 2 is a method for performing only playback. As noted above, when moving picture data obtained by streaming reception is recorded at the same time, it is desirable that data recording with high integrity is performed by receiving a lost packet using a retransmission request even if the packet does not arrive before the playback process starts.

However, in the case where only a playback process is performed and a recording process is not performed, if a retransmission request for a packet that does not arrive on time for playback is frequently sent, only the packet that does not arrive on time for playback is received. As a result, useless processing occurs. In addition, the amount of useless data transfer disadvantageously increases in the network.

According to the present invention, when a communication processing apparatus receives streaming data in order to perform, for example, a real-time streaming playback process, the communication processing apparatus has one of the following two states:

(1) a state in which "only playback" is performed, and
(2) a state in which "playback and recording" are performed.

The communication processing apparatus determines in which state it is and changes the way in which a retransmission request for a lost packet is sent on the basis of the determined state. Thus, the communication processing apparatus performs optimal control of retransmission in accordance with each of the states.

Figure 3:
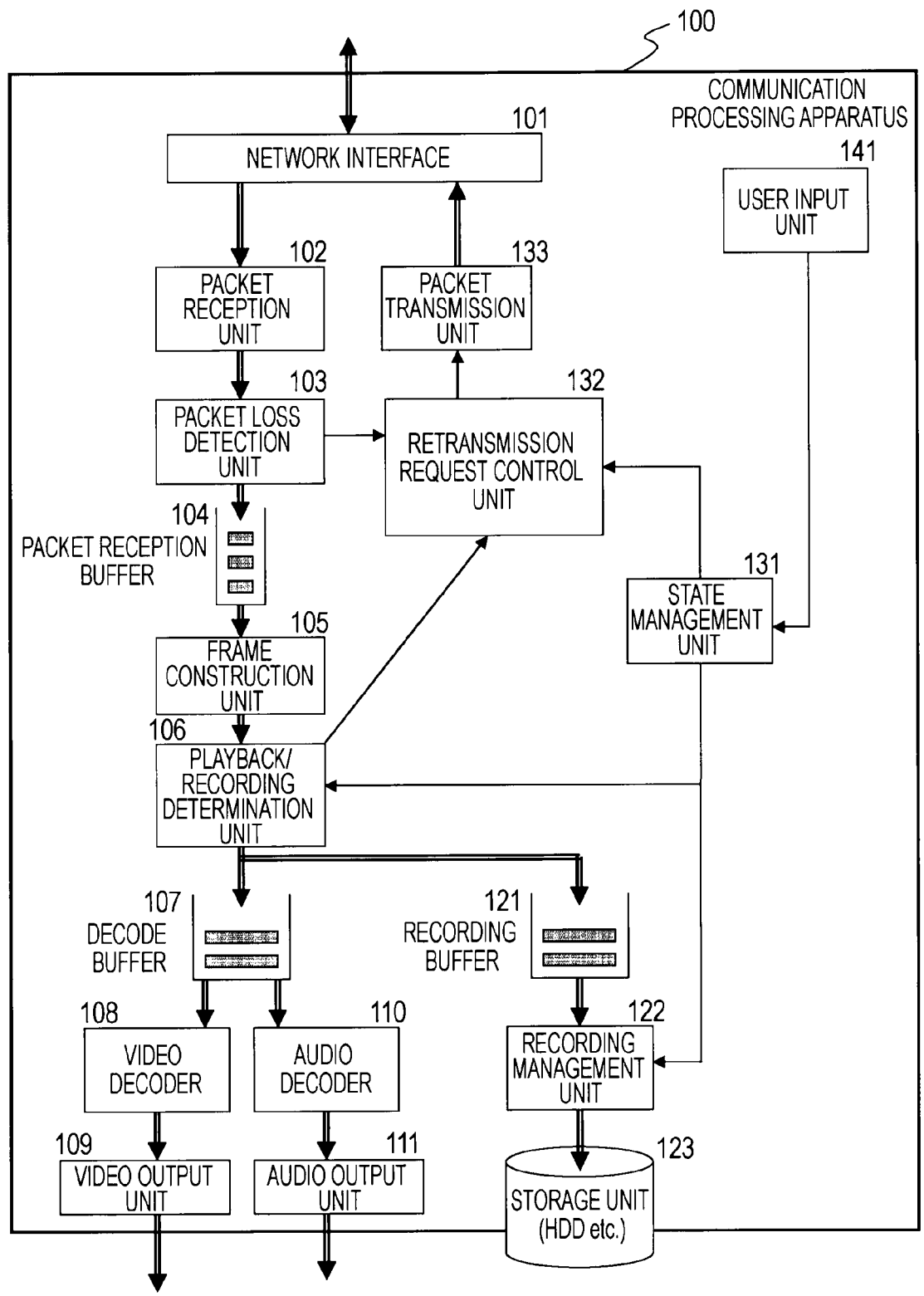
FIG. 3 is a block diagram of the structure of a communication processing apparatus according to an embodiment of the present invention.

The configuration of a communication processing apparatus according to the present invention and the process performed by the communication processing apparatus are described below with reference to FIG. 3 and the subsequent figures. FIG. 3 is a block diagram of the configuration of a communication processing apparatus according to the present invention. A communication processing apparatus 100 illustrated in FIG. 3 receives a packet transmitted from a data transmission apparatus (not shown) via a network interface 101 through communication using RTP and UDP protocols. The received packet has a structure described in FIG. 1. The received packet includes the following information:

a sequence number (16 bits)=a counter incremented by one for each packet,
a time stamp (32 bits)=a playback time,
a communication source identifier (SSRC) (32 bits)=a sender, and
a marker (1 bit)=identification information indicating whether or not it is the last packet of a video frame.

A packet reception unit 102 of the communication processing apparatus 100 receives a packet via the network interface 101. A packet loss detection unit 103 serving as a data loss detection unit detects a lost packet. This process is performed in order to identify the sequence number and the time stamp of the lost packet that is not received using the sequence number and the time stamp set for received packets.

After the packet loss detection unit 103 detects the lost packet, the received packets are accumulated in a packet reception buffer 104. Subsequently, a frame construction unit 105 retrieves actual data (a payload) from the packets so as to generate playback data (such as a frame image).

Subsequently, a playback/recording determination unit 106 determines in which one of the following states the communication processing apparatus 100 including the playback/recording determination unit 106 is:

(1) a state in which "only playback" is performed, or
(2) a state in which "playback and recording" are performed. In accordance with the determined state, the playback/recording determination unit 106 supplies the frame data generated by the frame construction unit 105 to a decode buffer 107 that forms a playback processing unit or a recording buffer 121 that performs a recording process or both.

If the communication processing apparatus 100 is in "(1) a state in which 'only playback' is performed", the playback/recording determination unit 106 supplies the frame data to the decode buffer 107 that forms the playback processing unit. If the communication processing apparatus 100 is in "(2) a state in which 'playback and recording' are performed", the playback/recording determination unit 106 supplies the frame data to the frame data to the decode buffer 107 that forms the playback processing unit and the recording buffer 121 that performs a recording process.

In the playback process, a video decoder 108 and an audio decoder 110 acquire the data accumulated in the decode buffer 107 and perform a decoding process. Subsequently, the video decoder 108 and the audio decoder 110 output the decoded data to a video output unit 109 and an audio output unit 111, respectively. Thus, the playback process is performed.

To perform the recording process, a recording management unit 122 acquires data accumulated in the recording buffer 121 and converts the data to a predetermined recording format. Thereafter, the recording management unit 122 stores the data in a storage unit 123, such as an HDD.

A process performed by the playback/recording determination unit 106 is described in detail next with reference to a flow illustrated in FIG. 4. At step S101, the playback/recording determination unit 106 examines the packet reception buffer 104 first to determine whether frame construction data has arrived or not. If frame construction data has arrived, the playback/recording determination unit 106, at step S102, determines whether the apparatus including the playback/recording determination unit 106 is in a state in which only playback is performed or a state in which playback and recording are performed. The playback/recording determination unit 106 illustrated in FIG. 3 receives state information from a state management unit 131 so as to determine the state of the apparatus.

If playback and recording are simultaneously performed, the processing proceeds to step S103. In step S103, the playback/recording determination unit 106 compares playback time information for a playback process with a playback time of a packet received from the packet reception buffer 104. In step S104, the playback/recording determination unit 106 transfers actual data acquired from the packet to the decode buffer 107 such that the data arrives at a process timing prior to the playback time.

Subsequently, in step S105, the playback/recording determination unit 106 outputs the playback time information to a retransmission request control unit 132. This information is used for the retransmission request control unit 132 to determine whether a retransmission request is sent or not. This process is described in more detail below.

In addition, in step S106, the playback/recording determination unit 106 transfers the actual data of the packet acquired from the packet reception buffer 104 to the recording buffer 121. In step S107, the playback/recording determination unit 106 deletes, from the packet reception buffer 104, the frame construction data that has already been transferred.

However, if only playback is performed and recording is not performed, the processing proceeds from step S102 to step S111. In step S111, the playback/recording determination unit 106 compares playback time information for a playback process with a playback time of a packet received from the packet reception buffer 104. In step S112, the playback/recording determination unit 106 transfers actual data acquired from the packet to the decode buffer 107 such that the data arrives at a process timing prior to the playback time.

Subsequently, in step S113, the playback/recording determination unit 106 outputs the playback time information to a retransmission request control unit 132. This information is used for the retransmission request control unit 132 to determine whether a retransmission request is sent or not. This process is described in more detail below. Finally, in step S114, the playback/recording determination unit 106 deletes, from the packet reception buffer 104, the frame construction data that has already been transferred.

Figure 4:
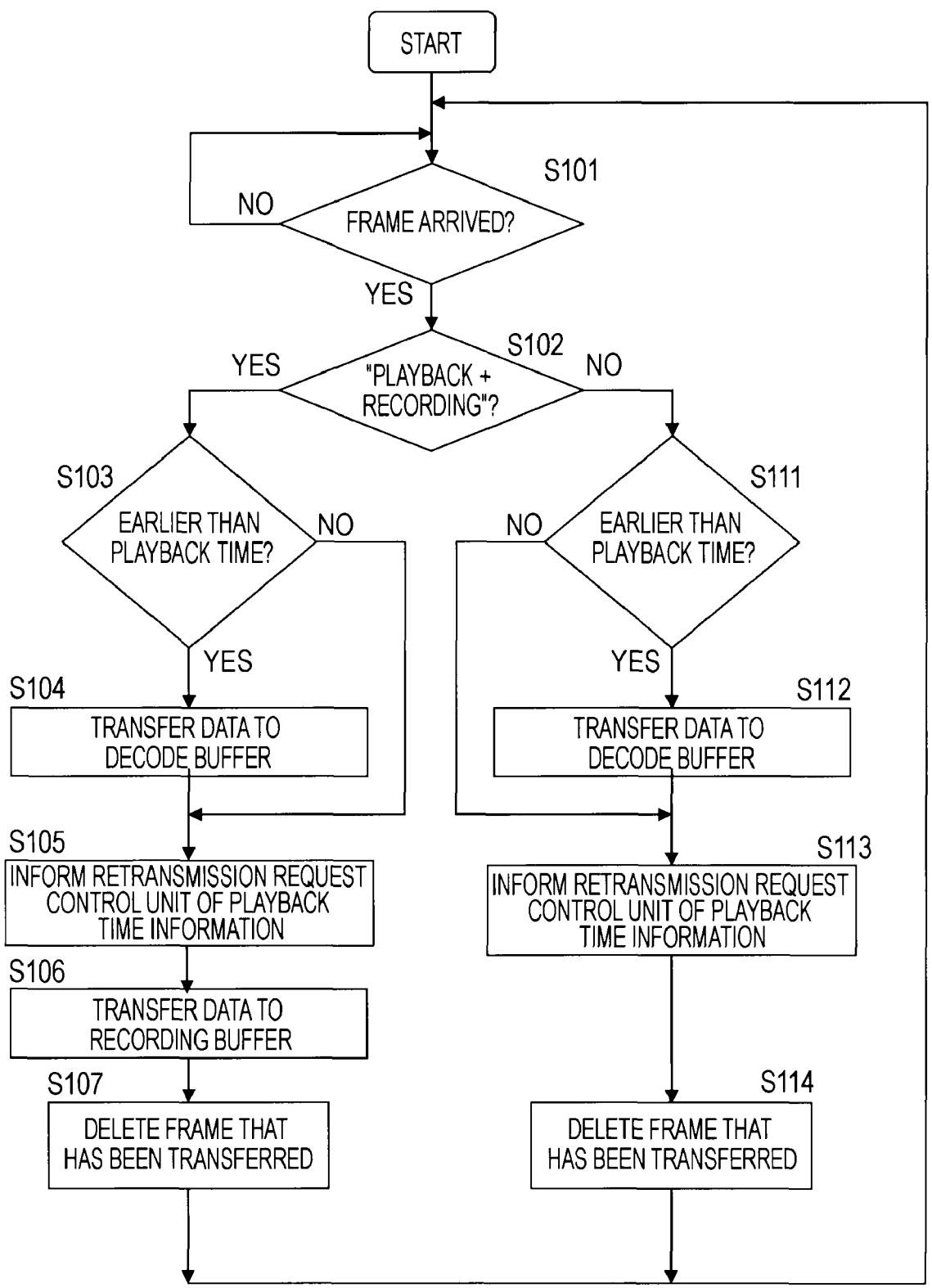
FIG. 4 is a flow chart illustrating a process sequence performed by a communication processing apparatus according to an embodiment of the present invention.

The playback/recording determination unit 106 continuously performs the processes in accordance with the flow illustrated in FIG. 4 until the playback process is completed or the playback and recording process are completed.

Retransmission request control for a lost packet performed by the communication processing apparatus 100 is described next with reference to FIG. 3. The packet loss detection unit 103 identifies the sequence number and the time stamp of a non-received lost packet using the sequence numbers and the time stamps set in received packets. Subsequently, the packet loss detection unit 103 outputs the lost packet information to the retransmission request control unit 132. In addition, the playback/recording determination unit 106 inputs, to the retransmission request control unit 132, playback time information for a playback process in execution, that is, a playback time set for a packet corresponding to data actually played back.

The retransmission request control unit 132 further receives, from the state management unit 131, the execution state of the communication processing apparatus, that is, information indicating which one of the following states is set:

(1) a state in which "only playback" is performed, or (2) a state in which "playback and recording" are performed. Note that this state setting can be switched in accordance with a user input from a user input unit 141.

The retransmission request control unit 132 receives this information, that is, the following information:

(a) the state of the communication processing apparatus (a state in which only playback is performed or a state in which playback and recording are performed), (b) lost packet information (the sequence number and the time stamp of a lost packet), and (c) playback time information (a playback time of a packet being subjected to a playback process), from the state management unit 131, the packet loss detection unit 103, and the playback/recording determination unit 106, respectively.

Furthermore, the retransmission request control unit 132 holds an RTT (Round-Trip Time) value that represents a measured data round-trip delay time, that is, an RTT that represents a delay time measured when data travels back and forth between the transmission side and the reception side in advance.

If the communication processing apparatus 100 is in a state in which "(1) 'only playback' is performed", the retransmission request control unit 132 determines whether a retransmission request is sent or not by determining whether the "playback time" of the lost packet is greater (later) or less (earlier) than the "current playback time+T (margin time)". That is, only when it is determined that a retransmitted packet can be received before playback thereof starts, the retransmission request control unit 132 sends a retransmission request.

In contrast, if the communication processing apparatus is in a state in which "(2) 'playback+recording' are performed", the retransmission request control unit 132 sends a retransmission request without determining whether a retransmitted packet can be received before playback thereof starts, and the retransmission request control unit 132 repeats sending a retransmission request until the number of requests reaches a predetermined maximum count.

Figure 5:
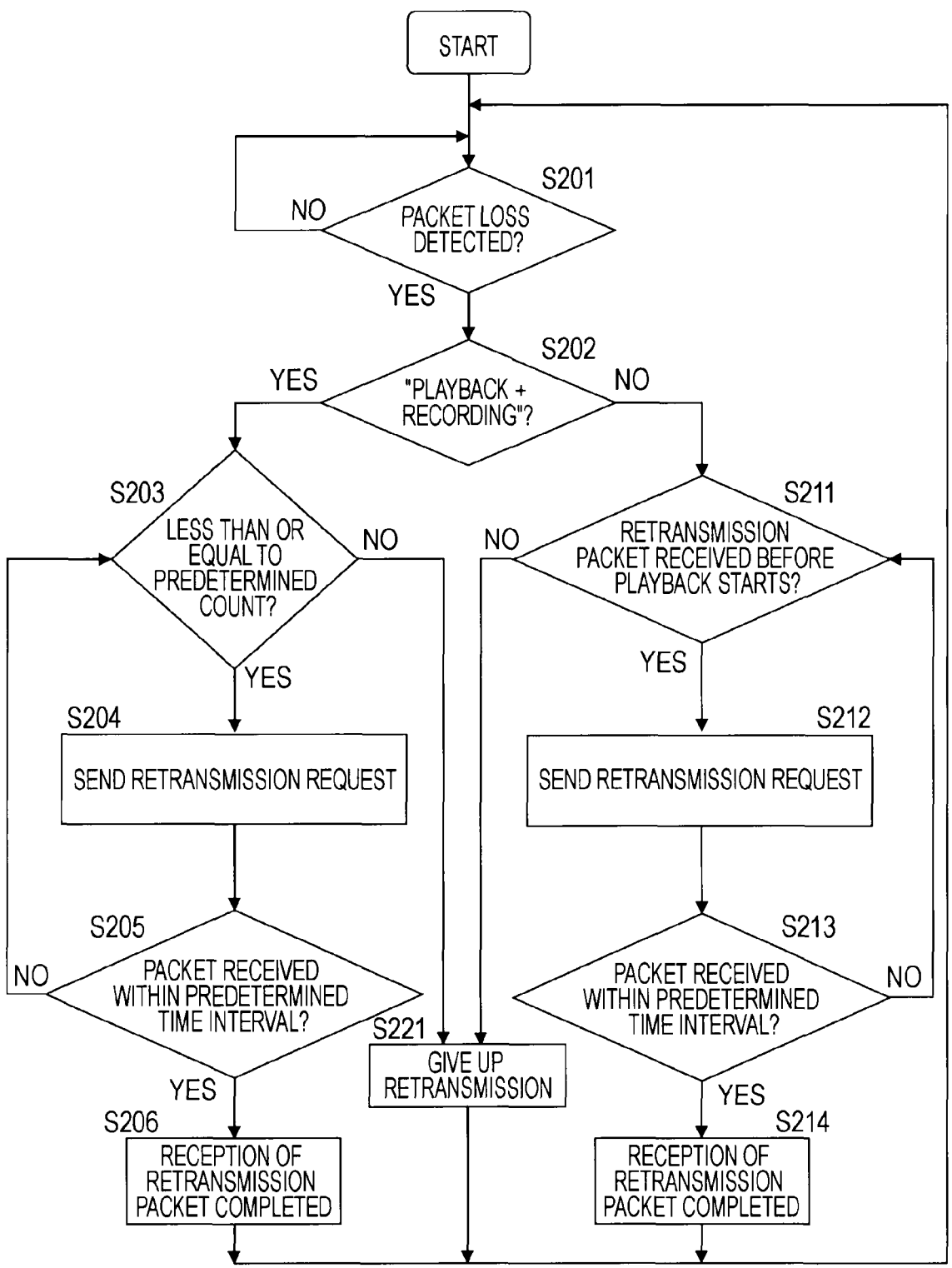
FIG. 5 is a flow chart illustrating a process sequence performed by a retransmission request control unit of a communication processing apparatus according to an embodiment of the present invention.

The retransmission request control process performed by the retransmission request control unit 132 is described next with reference to FIG. 5. In step S201, the retransmission request control unit 132 determines whether packet loss has been detected or not. This determination is made using information input from the packet loss detection unit 103 illustrated in FIG. 3.

Subsequently, in step S202, the retransmission request control unit 132 performs a state determination process in which it is determined whether the apparatus including the retransmission request control unit 132 is executing only playback or both playback and recording. This state determination process is performed on the basis of the information input from the state management unit 131 illustrated in FIG. 3. If the apparatus including the retransmission request control unit 132 is executing only playback, the processing proceeds to step S203. However, if the apparatus including the retransmission request control unit 132 is executing both playback and recording, the processing proceeds to step S211.

A process performed when the apparatus including the retransmission request control unit 132 is executing both playback and recording is described first. In the case where the apparatus including the retransmission request control unit 132 is executing both playback and recording, the retransmission request control unit 132, in step S203, determines whether the retransmission request count value exceeds the predetermined maximum count. The retransmission request control unit 132 counts the number of processes for a retransmission request for a particular packet and determines whether the count value exceeds the predetermined maximum count.

If the count value exceeds the predetermined count (the maximum count), the processing proceeds to step S221, where the processing is completed without sending a new retransmission request. However, if the count value does not exceed the predetermined count (the maximum count), the processing proceeds to step S204, where the retransmission request control unit 132 generates a retransmission request packet and outputs the retransmission request packet via a packet transmission unit 133.

Subsequently, in step S205, the retransmission request control unit 132 determines whether a retransmission packet is successfully received within a predetermined set time. If the retransmission packet has not been received, the processing returns to step S203. In step S203, the retransmission request control unit 132 further determines whether a retransmission request is sent again on the basis of the set count. If the retransmission packet has been received within the predetermined set time, the processing proceeds to step S206, where the retransmission request control unit 132 completes the reception of the retransmission packet.

In this way, in the case where a recording process is performed, the retransmission request control unit 132 repeatedly sends a different-layer request. That is, in the case where a recording process is performed, it is not determined whether the retransmission packet arrives before the playback starts.

In contrast, in the case where only a playback process is performed, the processing proceeds from step S202 to step S211. In the case where the apparatus including the retransmission request control unit 132 performs only a playback process, the retransmission request control unit 132, in step S211, determines whether a retransmission packet that arrives before the playback starts can be received or not. In this process, the following operation is performed:

(a) If the "playback time" of a lost packet is greater (later) than the "current playback time+T (margin time)", a margin greater than or equal to T is obtained before a received packet is played back. Accordingly, it is determined that a retransmission process is completed before playback is started, and therefore, a retransmission request is sent to the transmission side; and (b) If the "playback time" of the lost packet is less (earlier) than the "current playback time+T (margin time)", it is determined that reception of the lost packet on the basis of a retransmission request is not completed before playback is started, and therefore, a retransmission request is not sent.

In this way, the determination process performed in step S211 is performed as a determination process for sending a retransmission request only for a "packet that is likely to arrive on time for playback" from the reception side.

If it is determined that the packet cannot be received before the playback starts, the processing proceeds to step S221. In step S221, the retransmission request control unit 132 gives up sending a retransmission request, and therefore, does not send a retransmission request. However, it is determined that the packet can be received before the playback starts, the processing proceeds to step S212. In step S212, the retransmission request control unit 132 generates a retransmission request packet and outputs the retransmission request packet via the packet transmission unit 133.

Subsequently, in step S213, the retransmission request control unit 132 determines whether a retransmission packet has been successfully received within the predetermined set time. If the retransmission packet has not been received, the processing returns to step S211, where the retransmission request control unit 132 repeats a process for further determining whether a retransmission packet is sent again by determining whether the retransmission packet is received before the play back starts. If, in step S213, it is determined that the retransmission packet has been received within the limited time, the processing proceeds to step S214, where reception of the retransmission packet is completed.

As noted above, when a recording process is not performed and only playback is performed, it is determined whether a retransmission request is sent or not by determining whether a retransmission request packet is received before the playback starts.

In this way, according to the present invention, when a communication processing apparatus receives streaming data in order to perform, for example, a real-time streaming playback process, the communication processing apparatus is in one of the following two states:

(1) a state in which "only playback" is performed, and
(2) a state in which "playback and recording" are performed.

The communication processing apparatus determines in which state it is and changes the way in which a retransmission request for a lost packet is sent on the basis of the determined state. Thus, when the communication processing apparatus performs only a playback process, a real-time playback can be achieved. When the communication processing apparatus performs a recording process, the integrity of recorded data can be improved. In this way, a playback process and recording process that provide intended data states can be achieved.

Note that, in some cases, video data including an image and audio data played back in a streaming method needs to be recorded in the same manner as it is played back. Accordingly, it is desirable that a user can select that recording method. In such a case, data that is the same as the data stored in the decode buffer for a playback process can be recorded in the recording buffer 121 for recording.

While the present invention has been described in detail with reference to particular embodiments, it should be appreciated that modifications and alternatives of the embodiments may be made by those skilled in the art without departing from the spirit and scope of the invention. That is, the present invention has been described in the form of exemplary embodiments and is not to be limited to those exemplary embodiments. It is the present intention therefore to limit the present invention only as indicated by the scope of the claims.

In addition, a series of the processes described in the present specification can be performed by hardware, software, or combination of the both. When the processes are performed by software, the processes can be performed by installing a program containing the processing sequence in a non-transitory computer readable storage medium which is a memory of a computer incorporated in dedicated hardware or installing the program in a general-purpose computer that can execute a variety of processes.

For example, the program can be prerecorded in a hard disk or ROM (Read Only Memory) serving as a recording medium. Alternatively, the program can be temporarily or permanently stored (recorded) in a removable recording medium, such as a flexible disk, a CD-ROM (Compact Disc Read Only Memory), an MO (Magneto optical) disk, a DVD (Digital Versatile Disc), a magnetic disk, or a semiconductor memory. Such a removable recording medium can be provided as so-called package software.

In addition, the program can be installed in a computer from the above-described removable recording medium. Furthermore, the program can be wirelessly transferred from a download site to a computer, or the program can be transferred from a download site to a computer by wire via a network, such as a LAN (Local Area Network) or the Internet. The computer can receive a program transferred in such a way so as to install the program in an internal recording medium, such as a hard disk.

The various processes described in the present specification may be performed not only in the above-described sequence, but also in parallel or independently in accordance with the processing power of an apparatus that performs the processes or as needed. In addition, as used in the present specification, the term "system" refers to a logical combination of a plurality of devices; the plurality of devices is not necessarily included in one body.

INDUSTRIAL APPLICABILITY

As described above, according to an embodiment of the present invention, when a communication processing apparatus receives streaming data in order to perform, for example, a real-time streaming playback process, the communication processing apparatus is in one of the following two states:

(1) a state in which "only playback" is performed, and
(2) a state in which "playback and recording" are performed.

The communication processing apparatus determines in which state it is and changes the way in which a retransmission request for a lost packet is sent on the basis of the determined state. Thus, when the communication processing apparatus performs only a playback process, a real-time playback can be achieved. When the communication processing apparatus performs a recording process, the integrity of recorded data can be improved. In this way, a playback process and recording process that provide intended data states can be achieved.

The invention claimed is:

1. A communication processing apparatus for receiving data via a network, characterized in that the communication processing apparatus comprises a state management unit for performing state management as to whether a processing state of the communication processing apparatus is a playback state in which only playback of the received data is performed or a playback and recording state in which both playback and recording of the received data are performed, a data loss detection unit for detecting lost data in the received data, and a retransmission request control unit for performing a determination process as to whether a retransmission request for the lost data is output or not, and in that the retransmission request control unit determines whether a retransmission request is made or not on the basis of a determination whether retransmission data based on retransmission request data is received before a playback process starts when the communication processing apparatus is in the playback state in which only playback is performed, and the retransmission request control unit determines whether a retransmission request is made or not on the basis of a determination whether the number of sent retransmission requests for one lost data item reaches a predetermined set maximum count when the communication processing apparatus is in the playback and recording state in which both playback and recording are performed.

2. The communication processing apparatus according to claim 1, characterized in that the received data is data received on a packet-to-packet basis.

3. The communication processing apparatus according to claim 1, characterized in that the retransmission request control unit is configured to perform a process for determining whether a retransmission request is sent or not on the basis of a pre-measured round-trip delay time between the communication processing apparatus and a data transmission apparatus when the communication processing apparatus is in the playback state in which only playback is performed.

4. The communication processing apparatus according to claim 1, characterized in that it further comprises a decode buffer used for accumulating data applied to a playback process and a playback/recording determination unit for performing control for storing data in a recording buffer that accumulates data applied to a recording process, and the playback/recording determination unit is configured to receive, from the state management unit, state information indicating whether the processing state of the communication processing apparatus is the playback state in which only playback of the received data is performed or the playback and recording state in which both playback and recording of the received data are performed so as to change the way in which data accumulation processing is performed in the buffer.

5. The communication processing apparatus according to claim 4, characterized in that the playback/recording determination unit informs the retransmission request control unit of playback time information corresponding to received data being subjected to a playback process, and the retransmission request control unit is configured to determine whether retransmission data based on retransmission request data is received before a playback process starts using the information received from the playback/recording determination unit, namely, playback time information corresponding to reception data being subjected to a playback process.

6. A communication control method for use in a communication processing apparatus for receiving data via a network, characterized in that the communication control method comprises a state management step for determining by a state management unit whether a processing state of the communication processing apparatus is a playback state in which only playback of the received data is performed or a playback and recording state in which playback and recording of the received data are performed, a data loss detection step for detecting, by a data loss detection unit, lost data in the received data, and a retransmission request control step for performing, by a retransmission request control unit, a determination process as to whether a retransmission request for the lost data is output or not, and, in the retransmission request control step, the retransmission request control unit determines whether a retransmission request is made or not on the basis of a determination whether retransmission data based on retransmission request data is received before a playback process starts when the communication processing apparatus is in a playback state in which only playback is performed, and the retransmission request control unit determines whether a retransmission request is made or not on the basis of a determination whether the number of sent retransmission requests for one lost data item reaches a predetermined set maximum count when the communication processing apparatus is in a playback and recording state in which both playback and recording are performed.

7. The communication control method according to claim 6, characterized in that the received data is data received on a packet-to-packet basis.

8. The communication control method according to claim 6, characterized in that the retransmission request control step performs a process for determining whether a retransmission request is sent or not on the basis of a pre-measured round-trip delay time between the communication processing apparatus and a data transmission apparatus when the communication processing apparatus is in a playback state in which only playback is performed.

9. The communication control method according to claim 6, characterized in that it further comprises a playback/recording determination step for performing, by a playback/recording determination unit, control for storing data in a decode buffer used for accumulating data applied to a playback process and storing data in a recording buffer for accumulating data applied to a recording process, and in that, in the playback/recording determination step, the playback/recording determination unit receives, from the state management unit, state information indicating whether the processing state of the communication processing apparatus is a playback state in which only playback of the received data is performed or a playback and recording state in which both playback and recording of the received data are performed so as to change the way in which data accumulation processing is performed in the buffer.

10. The communication control method according to claim 9, characterized in that the playback/recording determination unit informs the retransmission request control unit of playback time information corresponding to received data being subjected to a playback process, and the retransmission request control unit determines whether retransmission data based on a retransmission request data is received before a playback process starts using the information received from the playback/recording determination unit, namely, playback time information corresponding to reception data being subjected to a playback process.

11. A non-transitory computer readable storage medium containing a computer program for causing a communication processing apparatus for receiving data via a network to perform communication control, characterized in that the computer program comprises a state management step for determining by a state management unit whether a processing state of the communication processing apparatus is a playback state in which only playback of the received data is performed or a playback and recording state in which playback and recording of the received data are performed, a data loss detection step for detecting, by a data loss detection unit, lost data in the received data, and a retransmission request control step for performing, by a retransmission request control unit, a determination process as to whether a retransmission request for the lost data is output or not, and, in the retransmission request control step, the retransmission request control unit determines whether a retransmission request is made or not on the basis of a determination whether retransmission data based on retransmission request data is received before a playback process starts when the communication processing apparatus is in a playback state in which only playback is performed, and the retransmission request control unit determines whether a retransmission request is made or not on the basis of a determination whether the number of sent retransmission requests for one lost data item reaches a predetermined set maximum count when the communication processing apparatus is in a playback and recording state in which both playback and recording are performed.

* * * * *